United States Patent [19]

Rose

[11] 4,396,755

[45] Aug. 2, 1983

[54] PRODUCTION OF AROMATIC POLYKETONES

[75] Inventor: John B. Rose, Letchworth, England

[73] Assignee: Imperial Chemical Industries PLC, London, England

[21] Appl. No.: 367,613

[22] Filed: Apr. 12, 1982

[30] Foreign Application Priority Data

Nov. 12, 1981 [GB] United Kingdom ............... 8134178

[51] Int. Cl.³ ............................................. C08G 67/00
[52] U.S. Cl. ..................................... 528/126; 528/128; 528/173; 528/176; 528/179; 528/190; 528/191; 528/193; 528/206; 528/207; 528/220; 528/223; 528/271; 528/360; 528/364
[58] Field of Search ............... 528/125, 126, 128, 173, 528/176, 190, 220, 271, 179, 223, 360, 364, 191, 193, 206, 207

[56] References Cited

U.S. PATENT DOCUMENTS 3,065,205 11/1962 Bonner, Jr. ........................ 528/190
3,324,199 6/1967 Tocker ............................... 528/190
4,247,682 1/1981 Dahl .................................. 528/190

FOREIGN PATENT DOCUMENTS 1060546 3/1967 United Kingdom .
1086021 10/1967 United Kingdom .
1164817 9/1969 United Kingdom .

OTHER PUBLICATIONS

"Polyarylsulfones, Synthesis and Properties," Journal of Polymer Science, Part A-1, vol. 8, 2035-2047 (1970), H. A. Vogel.

Primary Examiner—Lester L. Lee
Attorney, Agent, or Firm—Cushman, Darby & Cushman

[57] ABSTRACT

Production of an aromatic polyketone by reacting in the presence of a quinquevalent phosphorous halide (preferably $PCl_5$) and a fluoroalkane sulphonic acid (preferably $CF_3SO_2OH$) the reactants selected from: (a) a mixture of (i) at least one aromatic dicarboxylic acid $HO_2C$—Ar—$CO_2H$ where —Ar'— is a divalent aromatic radical and $CO_2H$ is an aromatically bound carboxylic acid group, which dicarboxylic acid is polymerizable with the at least one aromatic compound of (ii), and (ii) at least one aromatic compound H—Ar'—H where —Ar'— is a divalent aromatic radical and H is an aromatically bound hydrogen atom, which compound is polymerizable with the at least one dicarboxylic acid of (i); (b) at least one aromatic monocarboxylic acid H—Ar"—$CO_2H$ where —Ar"— is a divalent aromatic radical and H and $CO_2H$ are as defined in (a), which monocarboxylic acid is self-polymerizable; and (c) a combination of (a) and (b).

10 Claims, No Drawings

PRODUCTION OF AROMATIC POLYKETONES

The present invention relates to a process for the production of thermoplastic aromatic polyketones.

Thermoplastic aromatic polyketones are polymers which are well known to the art. They are of significant commercial utility in view of their excellent electrical insulating and mechanical properties at high temperatures, their high strength and toughness and their excellent resistance to fire and chemicals.

It is known, e.g. from British Pat. Nos. 1,086,021 and 1,164,817, to produce aromatic polyketones by electrophilic aroylation processes which utilize a reaction between a mixture of an aromatic diacyl halide and an aromatic compound containing at least two aromatically bound hydrogen atoms, or a self-reaction of an aromatic monoacyl halide containing at least one aromatically bound hydrogen atom, or a reaction involving the use of all three types of compound, in the presence of a metal salt such as an Fe salt or a $BF_3$/liquid HF mixture, these materials acting as Friedel-Crafts catalysts.

Such systems do, however, have their drawbacks: for example a $BF_3$/liquid HF mixture is extremely corrosive and physiologically harmful and its use requires the employment of pressure equipment, while the use of metallic salts may lead to contamination problems in the resulting polymer. Moreover, aromatic mono- or diacyl halides tend to be expensive starting materials which means that processes using them tend to be costly to operate.

I have now discovered a new process for the production of aromatic polyketones which does not require the use of $BF_3$/liquid HF mixture or a metallic salt as polymerization catalysts, nor even the use of mono- or diacyl halides as starting materials. Instead, this process uses aromatic mono- or dicarboxylic acids as starting materials. Aromatic carboxylic acids are, generally speaking, less expensive than aromatic acyl halides, so that the process of the invention may also allow a more economical production of aromatic polyketones to be realized.

According to the present invention there is provided a process for the production of an aromatic polyketone which comprises reacting in the presence of a quinquevalent phosphorous halide and a fluoroalkane sulphonic acid the reactants selected from the following class:

(a) a mixture of
 (i) at least one aromatic dicarboxylic acid of formula $$HO_2C—Ar—CO_2H$$

where —Ar— is a divalent aromatic radical and $CO_2H$ is an aromatically bound carboxylic acid group, which acid is polymerisable with the at least one aromatic compound of (a)(ii),
 (ii) at least one aromatic compound of formula $$H—Ar'—H$$

where —Ar'— is a divalent aromatic radical and H is an aromatically bound hydrogen atom, which compound is polymerisable with the at least one aromatic dicarboxylic acid of (a)(i), (b) at least one aromatic monocarboxylic acid of formula $$H—Ar''—CO_2H$$

where —Ar''— is a divalent aromatic radical and H is an aromatically bound hydrogen atom and $CO_2H$ is an aromatically bound carboxylic acid group, which acid is self-polymerisable, and (c) a combination of (a) and (b).

The halide of quinquevalent phosphorous is preferably a chloride or bromide, and may be for example phosphorous pentachloride, phosphorous pentabromide, phosphoryl chloride ($POCl_3$) or phosphoryl bromide ($POBr_3$). Generally speaking, there should be used at least as many moles of phosphorous halide as there are moles of $CO_2H$ groups present. Thus, for example, if an aromatic dicarboxylic acid is the sole aromatic carboxylic acid present, at least two moles of phosphorous halide per mole of aromatic dicarboxylic acid should be used. Preferably, there should be used substantially equimolar quantities of phosphorous halide and $CO_2H$ groups. Presumably, the reaction proceeds via the in-situ formation of mono- or diacyl halide, although we have not investigated the evidence for this.

In reaction sub-class (a), it is preferable that substantially equimolar quantities of said at least one aromatic dicarboxylic acid and said at least one aromatic compound (as defined) are employed.

Generally speaking, to effect the process of the invention it is convenient to dissolve or disperse the aromatic reactants in the fluoroalkane sulphonic acid and then to add the phosphorous halide followed by a period of reaction at the selected reaction temperature.

The presence of the fluoroalkane sulphonic acid in the process of the invention is a crucial feature, and it is thought that this reagent acts as a Lewis Acid. The preferred fluoroalkane sulphonic acids are trifluoromethane sulphonic acid $CF_3SO_2OH$, difluoromethane sulphonic acid $CF_2HSO_2OH$, and tetrafluoroethane sulphonic acid $CF_2HCF_2SO_2OH$. Other fluoroalkane sulphonic acids which may be used are the higher members of a series of fluoroalkane sulphonic acids containing 1 to 18 carbon atoms (which may be fully fluorinated as described in GB 758 467 or partially fluorinated), e.g. the fluoroethane and fluoropropane sulphonic acids such as $CF_3CF_2SO_2OH$ and $CF_3CF_2CF_2SO_2OH$. It is convenient to adjust the amount of fluoroalkane sulphonic acid used so that the acid acts as the reaction solvent. The use of a reaction system which comprises a more catalytic (i.e. much smaller) quantity of the fluoroalkane sulphonic acid is not, however, excluded from the scope of the invention.

The at least one aromatic dicarboxylic acid of (a)(i) is preferably selected from:

particularly 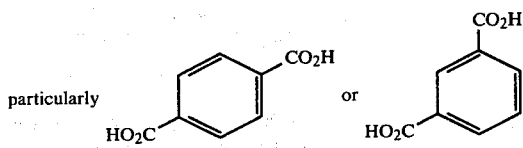

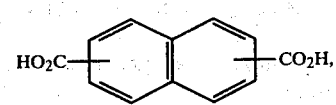

particularly 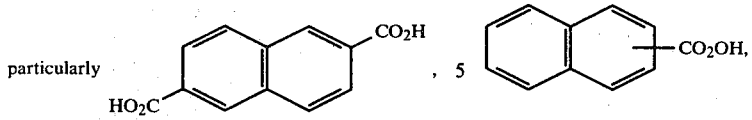

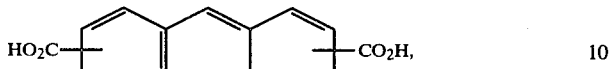

particularly 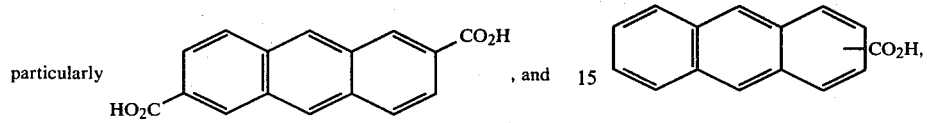

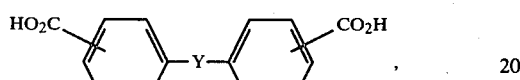

particularly HO₂C 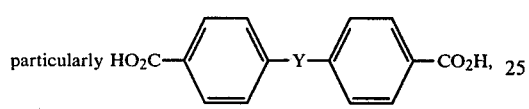, where —Y— is a direct link, —O—, —S—, —CO—, —SO₂—, —C(CF₃)₂— or

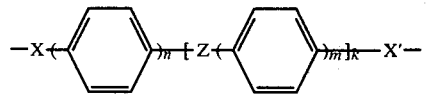

where n is 1 or 2, m is 1 or 2, k is 0 or 1, —X— and —X'— which may be the same or different are each a direct link, —O—, —S—, —CO—, —SO₂—, or —C(CF₃)₂—, and —Z— is —CO—, —SO₂—, or —C(CF₃)₂—.

The at least one aromatic compound of (a)(ii) is preferably selected from:

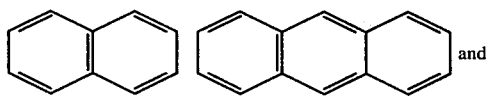 and

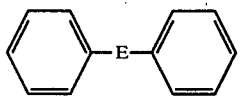

where —E— is a direct link, —O—, —S—, or

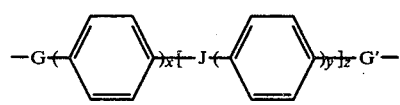

where x is 1 or 2, y is 1 or 2, z is 0 or 1, —G— and —G'— which may be the same or different are each a direct link, —O—, or —S—, and —J— is —CO—, —SO₂—, or —C(CF₃)₂—.

The at least one aromatic monocarboxylic acid of (b) is preferably selected from:

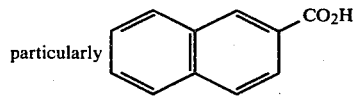

particularly 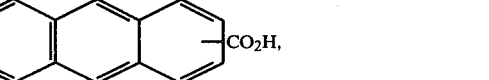

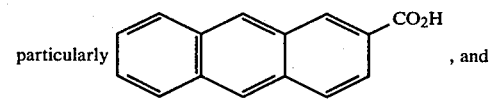

particularly 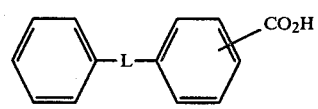, and

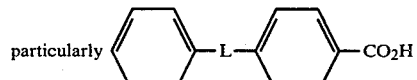, particularly 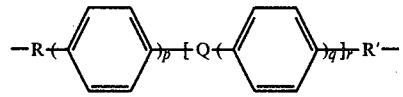

where —L— is a direct link, —O—, —S—, or

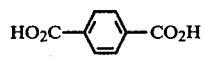

where p is 1 or 2, q is 1 or 2, r is 0 or 1, —R— is a direct link, —O—, or —S—, —R'— is a direct link, —O—, —S—, —CO—, —SO₂—, or —C(CF₃)₂—, and —Q— is —CO—, —SO₂— or C(CF₃)₂—.

The aromatic substances (as defined) which are used in the process of the invention are preferably unsubstituted in the aromatic nucleii (i.e. apart from the substituents present as indicated in the formulae in (a) and (b)); nuclear substitution tends to affect the activity of the aromatic substances in the polymerisation reaction. Nevertheless, nuclear-substituted aromatic substances may be employed in the present invention providing that the substituent or substituents do not deleteriously affect the polymerisation reaction or the properties of the polymer so produced. Whether or not the position and nature of a nuclear substituent has a deleterious effect may be discovered by experimentation.

In reactant sub-class (a)(i) of the invention, examples of aromatic dicarboxylic acids which may be used are:

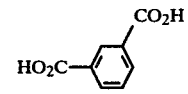

-continued

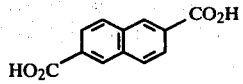
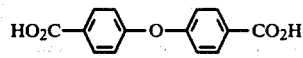
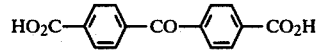
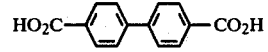
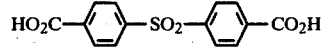
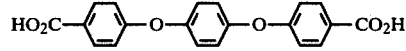
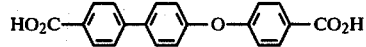
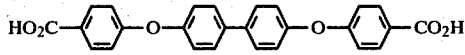

while examples of aromatic compounds in (a)(ii) which may be used are:

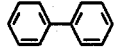
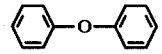
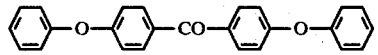
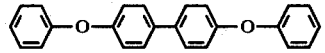
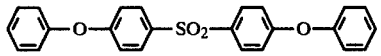
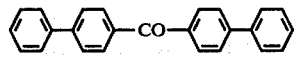
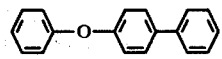

In reactant class (b) of the invention, examples of aromatic monocarboxylic acids which may be used are:

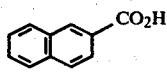
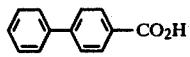

-continued

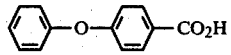
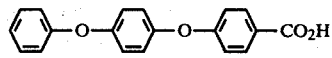
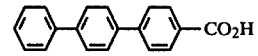
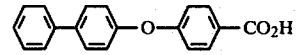
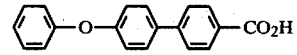

The aromatic polyketones produced by the process of the invention may have repeating units of the general formulae:

$$-Ar'-CO-Ar-CO-$$

and $$-Ar''-CO-$$

according to the aromatic substances used for the polymerisation.

It is found that aromatic polyketones of exceptionally high molecular weight may be produced by the process of the invention, having e.g. reduced viscosities (RVs) of up to (or even more than) 6. [In this specification, unless otherwise specified RV is measured at 25° C. on a solution of the polymer in conc. sulphuric acid of density 1.84 g cm$^{-3}$, said solution containing 1 g of polymer per 100 ml of solution.] Of course, aromatic polyketones of lower RVs may also be produced, although they usually have RV of at least 0.7.

The conditions required for the polymerisation reaction to produce the aromatic polyketone should be determined by experiment as they will often vary with the nature of the starting monomer(s) used and with the desired properties (e.g. molecular weight) of the polymer being manufactured. Conveniently the pressure employed may be atmospheric. A normal reaction temperature range is 40° to 200° C., particularly 50° to 150° C.

The present invention is now illustrated by the following examples.

EXAMPLE 1

Terephthalic acid (33.2 g; 0.2 mole), 4,4'-diphenoxybenzophenone (73.2 g; 0.2 mole) and 250 ml trifluoromethane sulphonic acid were weighed into a flask (capacity 500 ml) the interior of which had been flushed with nitrogen. The stirred flask contents were warmed to 65° C. to dissolve all the terephthalic acid and then cooled to about 15° C. Phosphorous pentachloride (83.2 g; 0.4 mole) was added slowly over 1 hour, the addition causing the solution to turn deep orange; evolution of HCl gas was noted (and the extent of HCl evolution was followed by using the gas to neutralize a 5 M NaOH solution). The reaction mixture was heated to 40° C. (when the solution became deep orange red) and, after 30 minutes at this temperature, heated to 100° C. (when the solution became dark red). The reaction mixture was heated at this temperature for about 13.5 hours (HCl gas evolution being followed as indicated above). The mixture was too viscous for it to be poured in its entirety out of the flask. However, some was poured into dilute NaOH solution to precipitate the polymer, which was macerated, washed on a sinter, and dried. The resulting aromatic polyketone was found (by nmr spectroscopy) to consist predominantly of repeat units of formula

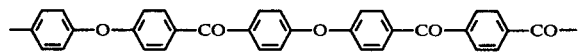

The RV of this polymer was 5.9.

EXAMPLE 2

Terephthalic acid (33.2 g; 0.2 mole), diphenyl ether (34.0 g; 0.2 mole) and 150 g trifluoromethane sulphonic acid were weighed into a nitrogen-flushed flask (capacity 500 ml). The flask was warmed to form a solution of the stirred reaction mixture in the sulphonic acid and then cooled to 15° C. Phosphorous pentachloride (83.0 g; 0.4 mole) was added dropwise over 35 minutes, the solution becoming deep orange (as in Example 1) and HCl gas being evolved (also as in Example 1). The reaction mixture was kept at about 20° C. for 1.5 hours and then heated to about 50° C. The reaction mixture was gradually heated to about 90° C. over 17.5 hours (NB this time period does not include an interruption in the heating after about 2 hours, when the heating of the reaction mixture was stopped overnight and resumed in the morning—a further 8 g of PCl$_5$ being added at this point). The resulting solution was too viscous to be poured out of the flask; accordingly the flask was smashed in 5 liters of demineralised water to give about 21 g of an aromatic polyketone, shown by nmr spectroscopy to consist predominantly of repeat units of formula

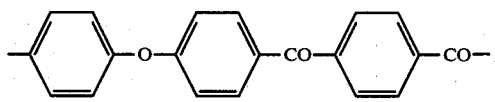

(sampling during the reaction accounting for the low yield to some extent), having an RV of 2.2.

EXAMPLE 3

Chloroterephthalic acid (20.06 g; 0.10 mole) and 4,4'-diphenoxy-diphenylsulphone (40.25 g; 0.10 mole) were weighed into a flask (capacity 500 ml) and, after flushing the interior of the flask for 30 minutes with nitrogen, 100 ml trifluoromethane sulphonic acid were added. The stirred mixture required slight warming (to about 50° C.) to dissolve all the reactants (the solution being allowed to cool to ambient temperature). Phosphorous pentachloride (41.65 g; 0.20 mole) was added slowly (over 1.5 hours) at 20° C., the rate of addition being governed by the degree of effervescence that occurred as a result of HCl evolution (and the extent of HCl evolution was followed by using the gas to neutralize a 4 N NaOH solution). The reaction mixture was heated to 70° C. over 2 hours, maintained at 50° C. for 15 hours (overnight), heated to 100° C. over 1 hour, and maintained at 100° C. for 5 hours, at 110° C. for 1 hour, and at 120° C. for 1.5 hours. The reaction mixture was poured into 4 liters of water to precipitate the polymer, which was macerated, washed on a sinter, and dried. The resulting aromatic polyketone (44 g) was found (by nmr spectroscopy) to consist predominantly of repeat units of formula

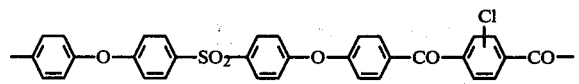

The RV of this polymer was 0.72 (measured in N,N-dimethylformamide and not conc. H$_2$SO$_4$—the other details of the measurement being as described above).

EXAMPLE 4

Substantially the same procedure as Example 3 was employed except that the monomers reacted were isophthalic acid (16.61 g; 0.10 mole) and 4,4'-diphenoxybenzophenone (36.64 g; 0.10 mole), with 100 ml trifluoromethane sulphonic acid and 41.65 g PCl$_5$ (0.20 mole) again being used—the latter being added over 1.25 hours at 20° C. The reaction mixture was heated to 50° C. over 30 minutes, maintained at 50° C. for 1 hour, heated to 100° C. over 30 minutes, maintained at 100° C. for 1.5 hours, heated to 120° C. over 1 hour, cooled to ambient temperature overnight, heated to 120° C. over 30 minutes, and maintained at 120° C. for 1 hour. The resulting reaction mixture was highly viscous and because of this it was only possible to pour about half of it into water to precipitate the polymer. After macerating, washing and drying, the resulting aromatic polyketone was found (by nmr spectroscopy) to consist predominantly of repeat units of formula

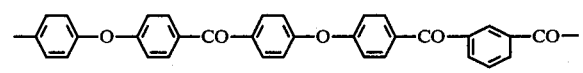

The RV of this polymer was 3.1.

I claim:
1. A process for the production of an aromatic polyketone which comprises reacting at a temperature of from 40° to 200° C. in the presence of a quinquevalent phosphorous halide and a fluoroalkane sulphonic acid the reactants selected from the group consisting of:
   (a) a mixture of equimolar quantities of
   (i) at least one aromatic dicarboxylic acid of formula

where —Ar— is a divalent aromatic radical and Co$_2$H is an aromatically bound carboxylic acid group, which acid is polymerisable with the at least one aromatic compound of (a)(ii),
   (ii) at least one aromatic compound of formula

where —Ar'— is a divalent aromatic radical and H is an aromatically bound hydrogen atom, which compound is polymerisable with the at least one aromatic dicarboxylic acid of (a)(i),
   (b) at least one aromatic monocarboxylic acid of formula

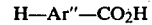

where —Ar"— is a divalent aromatic radical and H is an aromatically bound hydrogen atom and CO₂H is an aromatically bound carboxylic acid group, which acid is self-polymerisable, and (c) a combination of (a) and (b) said process being carried out with at least as many moles of phosphorous halide being used as are the number of moles of CO₂H groups used.

2. A process according to claim 1 wherein the fluoroalkane sulphonic acid used is trifluoromethane sulphonic acid or difluoromethane sulphonic acid.

3. A process according to claim 1 wherein the amount of the fluoroalkane sulphonic acid used is such that the fluoroalkane sulphonic acid acts as a reaction solvent.

4. A process according to claim 1 wherein substantially equimolar quantities of phosphorous halide and CO₂H groups are employed.

5. A process according to claim 1 wherein the phosphorous halide is phosphorous pentachloride or phosphorous pentabromide.

6. A process according to claim 1 wherein the at least one aromatic dicarboxylic acid of (a)(i) is selected from the group consisting of:

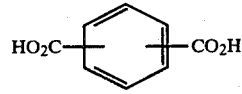

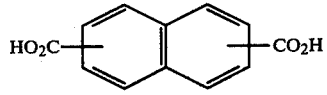

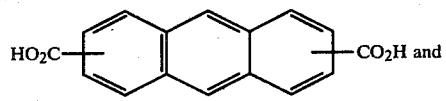

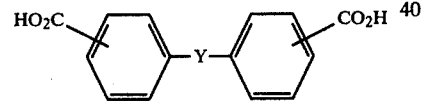

where —Y— is a direct link, —O—, —S—, —CO—, —SO₂—, —C(CF₃)₂—, or

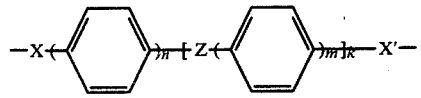

where n is 1 or 2, m is 1 or 2, k is 0 or 1, —X— and —X'— which may be the same or different are each a direct link, —O—, —S—, —CO—, —SO₂—, or —C(CF₃)₂—, and —Z— is —CO—, —SO₂—, or —C(CF₃)₂—.

7. A process according to claim 6 wherein the at least one aromatic dicarboxylic acid is selected from the group consisting of:

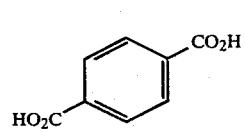
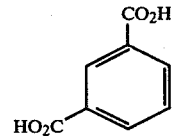

-continued

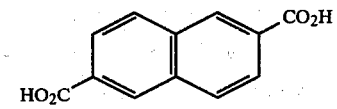

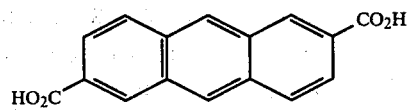
and

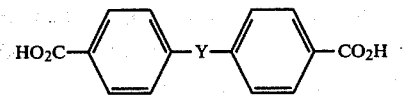

8. A process according to claim 1 wherein the at least one aromatic compound of (a)(ii) is selected from the group consisting of:

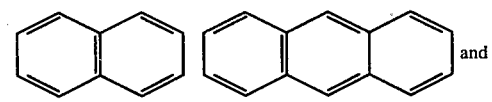
and

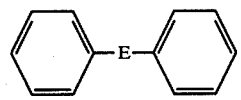

where —E— is a direct link, —O—, —S—, or

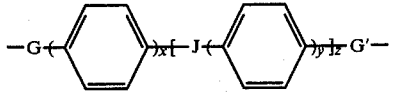

where x is 1 or 2, y is 1 or 2, z is 0 or 1, —G— and —G'— which may be the same or different are each a direct link, —O—, or —S—, and —J— is —CO—, —SO₂—, or —C(CF₃)₂—.

9. A process according to claim 1 wherein the at least one aromatic monocarboxyclic acid of (b) is selected from the group consisting of:

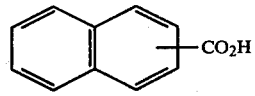

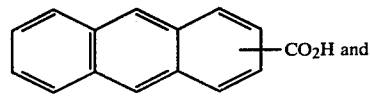
and

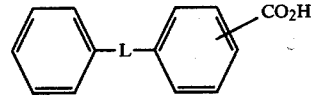

where —L— is a direct link, —O—, —S—, or

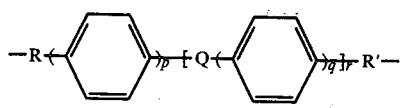
where p is 1 or 2, q is 1 or 2, r is 0 or 1, —R— is a direct link, —O—, or —S—, —R'— is a direct link, —O—, —S—, —CO—, —SO$_2$—, or —C(CF$_3$)$_2$—, and —Q— is —CO—, —SO$_2$— or C(CF$_3$)$_2$.
10. A process according to claim 9 wherein the at least one aromatic monocarboxylic acid is selected from the group consisting of:
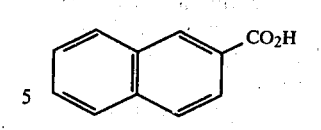
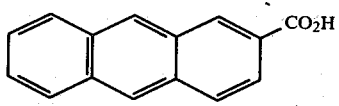 and
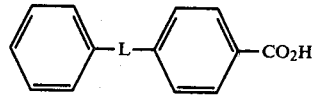
* * * * *